United States Patent [19]

Hütter et al.

[11] Patent Number: 4,844,240
[45] Date of Patent: Jul. 4, 1989

[54] DEVICE FOR STORING AND CONVEYING IN AN ORIENTATED MANNER OF SMALL ARTICLES

[75] Inventors: Odo Hütter, Kirchheim/Teck; Rainer Jung, Leonberg; Werner Kurz, Esslingen; Gerhardt Sperr, Waiblingen; Jürgen Voss, Stuttgart, all of Fed. Rep. of Germany

[73] Assignee: Robert Bosch GmbH, Stuttgart, Fed. Rep. of Germany

[21] Appl. No.: 116,562

[22] PCT Filed: Dec. 18, 1986

[86] PCT No.: PCT/DE86/00517

§ 371 Date: Sep. 30, 1987

§ 102(e) Date: Sep. 30, 1987

[87] PCT Pub. No.: WO87/04688

PCT Pub. Date: Aug. 13, 1987

[30] Foreign Application Priority Data

Jan. 30, 1986 [DE] Fed. Rep. of Germany ....... 3602773

[51] Int. Cl.[4] .............................................. B65G 47/24
[52] U.S. Cl. .................................. 198/391; 198/396; 198/443; 198/580; 198/771
[58] Field of Search ............... 198/391, 396, 443, 444, 198/453, 580, 609, 771, 954; 221/159, 160

[56] References Cited

U.S. PATENT DOCUMENTS 3,841,471 10/1974 Mead ................................... 198/396
4,175,654 11/1979 Lodge ................................. 221/160
4,282,965 8/1981 Bates et al. ......................... 221/159

Primary Examiner—Joseph E. Valenza
Attorney, Agent, or Firm—Michael J. Striker

[57] ABSTRACT

Device for storing small articles and conveying them in an orientated manner, includes a storage container (10), a slope conveyor (12), and an orientation conveyor (20) which is arranged parallel to the slope conveyor and is provided with a defined segment (68) for returning excessive small articles or those which are not orientated to the feed area (32) of the slope conveyor (12). The slope conveyor is provided with the actual conveying segment (50), a deflecting segment (52) for receiving small articles which are forced out of the conveying segment (50) laterally, the small articles arriving back in the feed area (32) of the slope conveyor (12) on the deflecting segment (52). A pile-up of small articles arrives in the output area (40) of the slope conveyor (12) and a localized circulation is formed in this location which prevents the small articles from entering the orientation segment (64).

16 Claims, 2 Drawing Sheets

DEVICE FOR STORING AND CONVEYING IN AN ORIENTATED MANNER OF SMALL ARTICLES

PRIOR ART

The invention is directed to a device for storing small articles and conveying the latter in an orientated manner. In a known device of this generic type, the small articles which are rejected in the orientation conveyor are returned practically along the entire length of the slope conveyor. Above a determined conveying speed of the slope conveyor, there is a tendency in this device for a circulation pile-up of small articles to be formed in the transition area between the slope conveyor and the orientation conveyor, the circulation pile-up is limited to this area and then also obstructs the passage of the small articles into the orientation segment if no back-up has formed there.

ADVANTAGES OF THE INVENTION

In contrast, the arrangement, according to the invention, comprising the characterizing features of the main claim, has the advantage that small articles are returned from the orientation conveyor in a defined area on the slope conveyor, the area being so far removed from its higher starting area that no circulation pile-up, which takes place in some areas and obstructs the access of the small articles to the continuing orientation segment, can form there or in the feed area of the orientation conveyor.

It is particularly advantageous if, the small articles rejected in the orientation conveyor are discarded on the feed area of the slope conveyor in a determined manner. The formation or maintenance of a pile-up in the slope conveyor is accordingly concentrated in its feed area and the pile-up breaks up when conveyed to the output area, so that an (intermediate) storage function can also be assigned to the slope conveyor without impairing the orderly supply of small articles to the orientation conveyor.

A simple construction, in which the small articles are rejected from the orientation conveyor without jamming, follows from the constructional features.

The area of use of the device can be enlarged if the return segment has its own drive and/or if the run-off of the orientation conveyor is constructed as a buffer segment which is connected with the orientation segment without interfaces.

The concentration of the pile-up formation on the feed area of the slope conveyor and the suitability of the latter as a secondary or intermediate storage is supported and improved in an effective manner, according to claim 8, if a deflecting segment for small articles which are forced out laterally is provided adjacent to the conveying segment of the slope conveyor so as to be parallel with it, the deflecting segment being preferably located in the same slant plane, its surface and drive being adapted to the nature of the small articles in such a way that the latter arrive back at the feed area of the slope conveyor from the deflecting segment. The deflecting segment provides that small articles do not jam in a crosswise manner relative to the conveying direction and that the pile-up breaks up in a reliable manner along the conveying segment so that the small articles are already extensively separated when they arrive in the output area of the slope conveyor.

The angle of inclination of the slope conveyor be at least large enough so that small articles lying on top of one another slide off of one another where the possibility of deflection exists and at least when the drive is running. Tests have shown that by means of this invention a device can be provided in which the conveying capacity can be varied within wide margins without a loss of operating reliability. Accordingly, there results a particularly large area of application of the device and a good adaptability to layout variants of assembly stations and systems.

If the slope conveyor is constructed as an oscillating conveyor, the storage container can be rigidly coupled with the slope conveyor, so that there is no need for a storage container with a moving base surface to have its own drive.

The device, according to the invention, can be further simplified if, the storage container is arranged above the conveying segment of the slope conveyor.

DRAWING

An embodiment example of the invention is shown in the drawing and explained in more detail in the following description. In a schematic manner, FIG. 1 shows a top view of the orientation conveyor and the slope conveyor, including the storage container, prior to assembly, and FIG. 2 shows a section through the device according to line II—II in FIG. 1.

DESCRIPTION OF THE EMBODIMENT EXAMPLE

Figure 1:
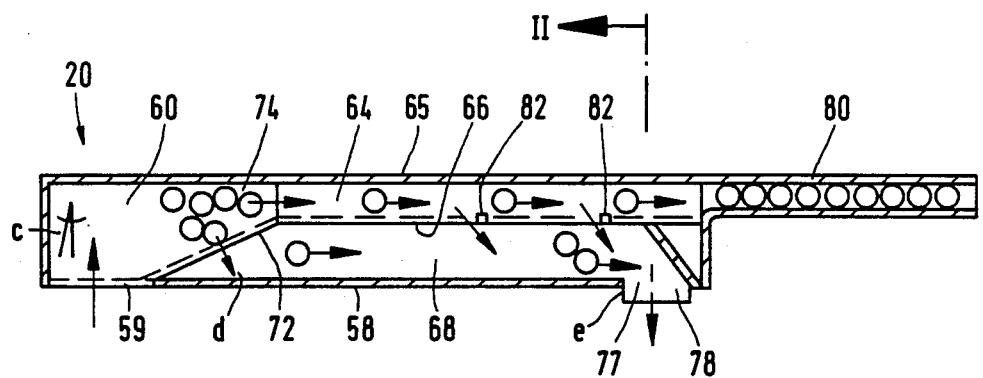
Figure 1:
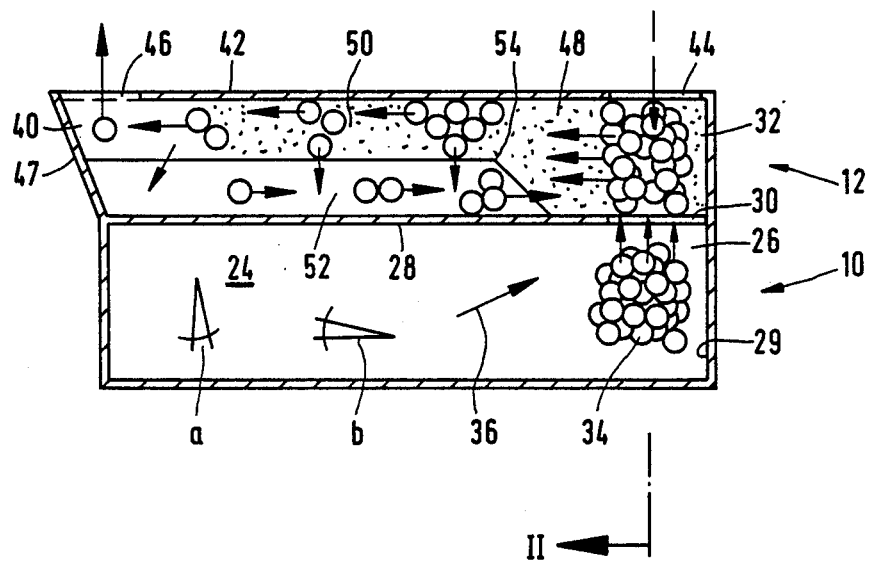

The device has a storage container 10 which forms a structural unit with a linear slope conveyor 12. Both units 10, 12 have a joint oscillating drive 14 which is arranged on a base plate 16 and is supported on a foundation 18 via the latter. A linear orientation conveyor 20, which has an oscillating drive 22, which is likewise fastened on the base plate 16, is arranged adjacent to the slope conveyor 12 so as to be parallel to it.

The storage container 10 has an inclined base 24 which has its deepest area in the container corner 26. There, in a common intermediate wall 28, an opening 30 is provided which leads into a feed area 32 of the slope conveyor 12. The base 24 is inclined toward the intermediate wall 28 and toward one partition 29 of the storage container 10, as shown in FIG. 1 by the angular symbols a and b. In addition, a pile-up of small articles located in the storage container 10 is indicated by the symbol 34, and an arrow 36 illustrates the conveyance of the stored small articles toward the opening 30 when the oscillating drive 14 is running.

The slope conveyor 12 has a base 38 which leads in an ascending manner from the feed area 32 to an output area 40 which is located higher than the latter. On the side remote of the storage container 10, the slope conveyor 12 is defined by a side wall 42 which is provided with an upwardly open border blocking 44 in the feed area 32 and leaves open an opening 46 extending to the base 38. The starting area 40 is defined by a wall 47 which is slanted toward the conveying direction and deflects arriving small articles into the opening 46 in the output area.

The base 38 of the slope conveyor 12 comprises a surface area 48 with coarse surface which covers the feed area 32 completely and covers the rest of the area of the slope conveyor 12 up to approximately half its width. Accordingly, a conveying segment 50 results on which the small articles arrive in the output area 40 from the feed area 32. The remaining portion of the base 38 has a smooth surface and forms a deflecting segment 52 which runs in adjacent to the conveying segment 50 and ends before the feed area 32. The arrangement is carried out in such a way that the width of the deflecting segment 52 steadily decreases to 0 starting from location 54.

The oscillating drive 14, the angle of inclination, the composition of the conveyor segment 50 and the deflecting segment 52 are adapted to the small articles, which are to be conveyed, in such a way that the small articles wander upward on the conveyor segment 50 and slide down on the deflecting segment 52 in a wide area of the conveying capacity. These movements are indicated by arrows at the symbols for the small articles in FIG. 1. Moreover, the angle of inclination of the slope conveyor 12 is selected so as to be large enough that small articles lying on top of one another slide off of one another when there is the possibility of deflection and at least when the drive is running.

The orientation conveyor 20 has a side wall 58 which faces the slope conveyor 12 and comprises an opening 59 which is located opposite the opening 46 of the slope conveyor 12, which opening 59 leads into a feed area 60. The latter has a base 62 which slants downward until the height of an orientation segment 64 according to the angular symbol c. This orientation segment 64 has a running surface which is defined in width by a rear wall 65 and a longitudinal edge 66 which extends approximately to the middle of the width of the orientation conveyor 20. A returning segment 68, which is defined in width by the side wall 58 and an intermediate wall 70, which extends vertically to the height of the longitudinal edge 66, is arranged adjacent to the orientation segment 64 so as to be parallel to it.

Figure 2:
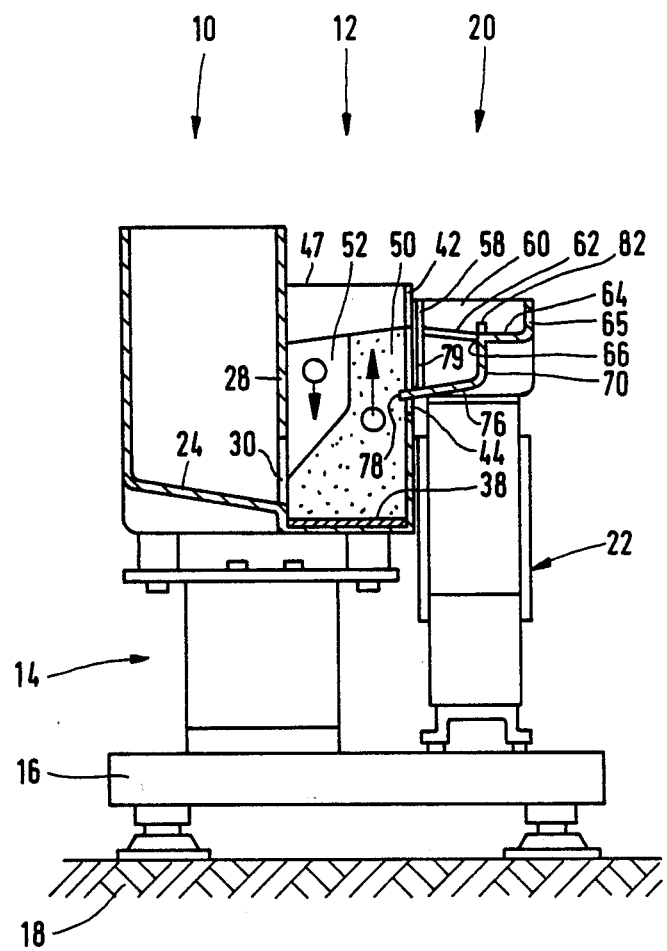

The intermediate wall 70 has a wall portion 72 which faces the feed area 60 and continuously narrows the feed area 60 toward a transition area 74 to the orientation segment 64. The returning segment 68 has a base 76 which drops off slightly toward the side wall 58, which is provided with an opening 77 at the output of the returning segment 68, which opening 77 extends until the base 76. This opening 77 is located in the side wall 42 of the slope conveyor 12 opposite the border blocking 44 after the parts are assembled, wherein a tongue-like projection 78 of the base 76 projects into the feed area 32 of the slope conveyor 12. The height of the side wall 58 is decreased between points d and e to an overflow edge 79 (FIG. 2) which prevents a pile-up of small articles in the returning segment 68.

The orientation segment 64 passes into an output segment 80 without interfacing, which output segment 80 is constructed as a buffer segment and can possibly be an exchangeable added part. The orientation segment 64 itself is provided with baffles 82 which are only indicated schematically in the drawing and which deflect small articles which are not orientated into the returning segment 68 via the longitudinal edge 66. The running surface and the baffles of the orientation segment 64 are adapted to the small articles to be conveyed and are advisably constructed as exchangeable parts.

The described device operates as follows: The oscillating drive 14 conveys the pile-up of small articles contained in the storage container 10, for example, annular disks, toward the container corner 26, from which the small articles arrive in the feed area 32 of the slope conveyor 12 through the opening 30. The feed to the feed area 32 can be effected in a controlled manner by means of sensors, not shown, regardless of the extent of accumulation in the feed area 32. In many cases, however, it is possible to make due without an additional control device, since the feed is automatically throttled if the filling state in the feed area 32 approaches the upper border of the opening 30. The base angle b of the storage container 10 is advisably selected so as to be somewhat greater than the angle of inclination of the slope conveyor 12 so that a conveying of the pile-up of small articles into the container corner 26 is ensured in the storage container 10 in each instance.

From the feed area 32 of the slope conveyor 12, the small articles lying on its base 38 are first moved to the left in the direction of the arrow along its entire width. However, at the start of the deflecting segment, the conveyor width gradually narrows to the width of the conveying segment 50 on which the small articles are carried along in an upward direction. The small articles which are forced out laterally from the conveying segment 50 and arrive on the deflecting segment 52 slide downward on the latter toward the feed area 32 and are channeled into the conveying segment 50 again. In this way, after a determined filling level or conveying capacity has been reached, a circulation arises in the slope conveyor 12 which does not obstruct the conveying and which permits a certain storage or buffer operation for a partial quantity of the small articles which are to be conveyed to be assigned to the slope conveyor 12 without a loss of operating reliability.

The advantageous effect of the deflecting segment 52 is further supported by means of the relatively large angle of inclination of the slope conveyor 12. Accordingly, a small article circulation also arises in the longitudinal plane of the longitudinal conveyor 12, which longitudinal plane is perpendicular to the drawing plane; this circulation of small articles helps the latter to be conveyed from the feed area 32 without jamming and prevents larger portions of the piled-up articles from reaching the output area 40 of the slope conveyor 12 from the feed area 32. The small articles are already separated, at least to a great extent, when they arrive at the latter location and are deflected into the feed area 60 of the orientation conveyor 20 by means of the sloping wall 47.

In the feed area 60 of the orientation conveyor 20, the small articles slide into the transition area 74 under the influence of gravitational force and the oscillating drive 22, and, from there, they reach the orientation segment 64. In the latter location, small articles which are not orientated are deflected laterally at the baffles 82 into the returning segment 68 on which they are returned to the feed area 32 of the slope conveyor 12. The orientated small articles are directed further into the output segment 80 and are fetched from the work stations as needed. When there is a back-up in the orientation segment 64, small articles likewise fall into the returning segment 68 from the feed area 60 or the transition area 74 via the base edge at the wall portion 72 and are returned to the feed area 32 of the slope conveyor 12 in a determined manner from the returning segment 68.

If, in an exceptional case, a pile-up should also form in the returning segment 68, the small articles are returned to the conveying segment 50 of the slope conveyor 12 via the overflow edge 79. A circulation of the small articles in the slope conveyor 12 is supported by means of the return of the small articles to the feed area 32 of the slope conveyor, this return being purposeful under normal conditions; this circulation prevents a pile-up of small articles from forming in the output area 40 and ensures a perfect operation of the device in cooperation with the aforementioned steps and means forming and promoting circulation.

The storage container 10 could also be constructed as an autonomous constructional unit and could be provided with its own drive. The principle of forming circulation in the slope conveyor 12 under the influence of the quantity of small articles located in its feed area 32, according to the invention, can also be realized if other conveying means, e.g., belt conveyors, are provided instead of the oscillating drive. The storage container 10 could also be placed directly on the conveying segment 50 of a slope conveyor with oscillating drive, wherein a deflecting segment can be dispensed with. The returning segment 68 of the orientation conveyor 20 could have its own drive or could also be constructed in a different manner. It is important that it return the rejected small articles to the feed area 32 of the slope conveyor 12 in a purposeful manner.

We claim:

1. Device for storing small articles and conveying them in an orientated manner, comprising a storage container for an irregular pile-up of small articles, means for conveying small articles from the storage container to a feed area of a linear slope conveyor, means for deflecting the small articles arriving in an output area of the slope conveyor to a feed area of a linear orientation conveyor, the output area being located at a higher level than said feed area of said slope conveyor; the orientation conveyor being arranged adjacent to the slope conveyor and extending parallel to it, and having an orientation segment leading into a run-off in the opposite direction of the slope conveyor, said orientation segment being provided with baffles for orientating the small articles, said orientation conveyor further including a linear returning segment for receiving small articles which are not orientated, or are excessive, or form a pile-up, said returning segment conveys in the same direction as the orientation segment and leads to a device which throws off the small articles on the slope conveyor; said slope conveyor including a conveying segment and a deflecting segment, which is adjacent to the conveying segment and extends parallel to it and is located in the same slope plane to receive small articles which are forced out laterally from the conveying segment, the surface of the deflecting segment being adapted to the qualities of the small articles in such a way that the latter arrive back on in the feed area of the slope conveyor.

2. Device according to claim 1, characterized in that the orientation conveyor (20) is constructed as an oscillating conveyor and the base (62) of its feed area (60), as seen from the output area (40) of the slope conveyor (12), is inclined diagonally in a downward direction until approximately the height of the orientation segment (64); further, in that the returning segment (68) is lower than the orientation segment (64), but higher than the feed area (32) of the slope conveyor (12); and in that the returning segment (68) is provided at its longitudinal border facing the slope conveyor (12) with a border shoulder (58, 79) or raised base portion which extends until the place (77, 78) at which the returned small articles are thrown off.

3. Device according to claim 2, characterized in that the transition from the feed area (60) of the orientation conveyor (20) to its returning segment (68) is formed at a wall (72) which continuously narrows the feed area (60) toward the transition area (74) to the orientation segment (64).

4. Device according to claim 1 wherein the run-off of the orientation conveyor (20) is constructed as a buffer segment (80) which is connected with the orientation segment (64), preferably without interfaces.

5. Device according to claim 1, characterized in that the angle of inclination of the slope conveyor (12) is selected so as to be at least large enough that small articles, which lie on top of one another, slide off of one another when there is a possibility of deflection and at least when the drive (14) is running.

6. Device according to claim 4, wherein the deflecting segment (52) is arranged on the side of the conveyor segment (50) of the slope conveyor (12) which is remote of the orientation conveyor (20).

7. Device according to claim 1 wherein the conveying segment (50) and the deflecting segment (52) have a common drive (14) and a joint base element (38) which has two adjacent surface areas with different surface characteristics.

8. Device according to claim 7, characterized in that in the feed area (32) of the slope conveyor (12), the surface area (48) forming the conveying segment (50) occupies the entire width of the base element (38) and in that the width of the surface area forming the deflecting segment (52) continuously increases at least along a portion of its length.

9. Device according to claim 1, wherein the feed of small articles from the storage container (10) to the feed area (32) of the slope conveyor (12) is effected in a controlled manner according to the extent of its occupation, particularly in its feed area (12).

10. Device according to claim 1, wherein the slope conveyor (12) is constructed as an oscillating conveyor and is rigidly coupled with a storage container.

11. Device according to claim 1, wherein the storage container is arranged above the conveyor segment (50) of the slope conveyor (12).

12. Device according to claim 1, wherein the returning segment is arranged between the orientation segment and the slope conveyor.

13. Device according to claim 5, wherein the deflecting segment is arranged on the side of the conveying segment of the slope conveyor which is remote of the orientation conveyor.

14. Device according to claim 5 wherein the conveying segment and the deflecting segment have a common drive and a joint base element which has two adjacent surface areas with different surface characteristics.

15. Device according to claim 6, wherein the conveying segment and the deflecting segment have a common drive and a joint base element which has two adjacent surface areas with different surface characteristics.

16. Device according to claim 1 wherein said storage container and said slope conveyor have a common oscillating drive, and said orientation conveyor having a separate oscillating drive.

* * * * *